(12) United States Patent
Huque

(10) Patent No.: US 8,117,453 B2
(45) Date of Patent: Feb. 14, 2012

(54) CUSTOMIZATION OF AN ELECTRONIC CIRCUIT

(75) Inventor: Thierry Huque, Hannut (BE)

(73) Assignee: Proton World International N.V., Zaventem (BE)

( * ) Notice: Subject to any disclaimer, the term of this patent is extended or adjusted under 35 U.S.C. 154(b) by 1485 days.

(21) Appl. No.: 11/602,794

(22) Filed: Nov. 21, 2006

(65) Prior Publication Data

US 2007/0118753 A1   May 24, 2007

(30) Foreign Application Priority Data

Nov. 23, 2005  (FR) .................................. 05 53563

(51) Int. Cl.
*G06F 21/00* (2006.01)
*H04L 9/30* (2006.01)
*H04L 29/02* (2006.01)
*G11C 7/00* (2006.01)

(52) U.S. Cl. ........ 713/172; 713/156; 713/159; 713/175; 713/176; 726/9; 726/20

(58) Field of Classification Search .................. None
See application file for complete search history.

(56) References Cited

U.S. PATENT DOCUMENTS

| 6,038,551 | A * | 3/2000 | Barlow et al. | 705/41 |
|---|---|---|---|---|
| 6,192,131 | B1 * | 2/2001 | Geer et al. | 380/283 |
| 6,212,634 | B1 * | 4/2001 | Geer et al. | 713/156 |
| 6,253,322 | B1 * | 6/2001 | Susaki et al. | 713/170 |
| 6,385,723 | B1 * | 5/2002 | Richards | 713/160 |
| 6,490,358 | B1 * | 12/2002 | Geer et al. | 380/286 |
| 6,810,479 | B1 * | 10/2004 | Barlow et al. | 713/185 |
| 6,889,324 | B1 * | 5/2005 | Kanai et al. | 713/176 |
| 7,669,055 | B2 * | 2/2010 | Everett et al. | 713/173 |
| 7,707,408 | B2 * | 4/2010 | Everett et al. | 713/160 |
| 7,730,310 | B2 * | 6/2010 | Everett et al. | 713/172 |
| 7,730,311 | B2 * | 6/2010 | Everett et al. | 713/172 |
| 7,734,923 | B2 * | 6/2010 | Everett et al. | 713/172 |
| 7,917,760 | B2 * | 3/2011 | McKeon et al. | 713/172 |
| 2003/0098775 | A1 | 5/2003 | Hazard | |
| 2003/0115468 | A1 * | 6/2003 | Aull et al. | 713/175 |
| 2004/0025021 | A1 * | 2/2004 | Aikawa et al. | 713/172 |
| 2004/0059685 | A1 * | 3/2004 | Sakamura et al. | 705/65 |
| 2004/0128247 | A1 * | 7/2004 | Sato et al. | 705/41 |
| 2004/0144840 | A1 * | 7/2004 | Lee et al. | 235/380 |
| 2004/0210566 | A1 | 10/2004 | Smith et al. | |

(Continued)

FOREIGN PATENT DOCUMENTS

WO    WO 99/40549 A1    8/1999

OTHER PUBLICATIONS

French Search Report from corresponding French Application No. 05/53563, filed Nov. 23, 2005.

(Continued)

*Primary Examiner* — Christopher Revak
(74) *Attorney, Agent, or Firm* — Wolf, Greenfield & Sacks, P.C.

(57) ABSTRACT

A method and a system of customization and authentication of an electronic circuit for an application implementing an asymmetrical algorithm and using a certification authority, including use of an authentication channel of another application implementing the same asymmetrical algorithm and using another certification authority.

9 Claims, 3 Drawing Sheets

U.S. PATENT DOCUMENTS

| | | | | |
|---|---|---|---|---|
| 2004/0215964 A1* | 10/2004 | Barlow et al. | | 713/172 |
| 2005/0050324 A1* | 3/2005 | Corbett et al. | | 713/168 |
| 2005/0138386 A1* | 6/2005 | Le Saint | | 713/185 |
| 2005/0138387 A1* | 6/2005 | Lam et al. | | 713/185 |
| 2005/0188202 A1* | 8/2005 | Popp | | 713/175 |
| 2005/0221853 A1* | 10/2005 | Silvester | | 455/551 |
| 2006/0085633 A1* | 4/2006 | Balfanz et al. | | 713/155 |
| 2006/0101507 A1* | 5/2006 | Camenisch | | 726/5 |
| 2006/0130154 A1* | 6/2006 | Lam et al. | | 726/30 |
| 2006/0168657 A1* | 7/2006 | Baentsch et al. | | 726/21 |
| 2007/0079122 A1* | 4/2007 | Han et al. | | 713/170 |
| 2007/0130617 A1* | 6/2007 | Durfee et al. | | 726/5 |
| 2011/0113241 A1* | 5/2011 | Umezawa et al. | | 713/156 |
| 2011/0211699 A1* | 9/2011 | Ma et al. | | 380/278 |

OTHER PUBLICATIONS

French Search Report from corresponding French Application No. 05/53562, filed Nov. 23, 2005.

* cited by examiner

CUSTOMIZATION OF AN ELECTRONIC CIRCUIT

BACKGROUND OF THE INVENTION

1. Field of the Invention

The present invention generally relates to authentication and/or ciphering electronic circuits, for example, contained in smart cards.

An example of application of the present invention relates to bank cards, the main application of which is to be used as means of payment. In this application, the present invention more specifically relates to so-called EMV smart cards (Europay MasterCard Visa) having a standardized operation and, among said cards, to cards fulfilling standards EMV 4.0 and the subsequent applying to smart cards provided with an asymmetrical ciphering function (especially RSA).

2. Discussion of the Related Art

FIG. 1 very schematically shows an example of a smart card of the type to which the present invention applies. An integrated circuit chip 1 is inserted in a plastic card 2 and is connected to metal contacts 3 to communicate with a card reader, not shown. In applications to bank cards, the card communicates through contacts 3 with the reader but may also be provided with a contactless communication system, for example, for other applications.

FIG. 2 very schematically shows in the form of blocks, components of an integrated circuit 1 forming a chip of a card 2 of FIG. 1. Circuit or chip 1 comprises a central processing unit 11 (CPU), one or several non-volatile storage elements 12 (NVM), one or several volatile storage elements 13 (for example, of RAM or register type). The different components of chip 1 communicate together and with an input/output device 14 (I/O) connected to contacts 3 over one or several address and control data buses 15.

The present invention applies to electronic circuits capable of implementing an asymmetrical ciphering algorithm (also called public key algorithm). This functionality is illustrated in FIG. 2 by the presence of a block 16 (RSA FCT) showing that the chip integrates an RSA-type function (hardware and/or software). The RSA algorithm is an asymmetrical algorithm consisting of a modular exponentiation of the message to be ciphered by using the key as an exponent.

In public key architectures, once the pair of public and private keys has been generated, the public key is certified by a certification authority (CA) or trusted third party.

The private key of a transmitting entity is used to sign a message, that is, generate a set of bits called the digital signature, which is a function of the actual message, and of the private key of the entity. The receiver of a message comprising a digital signature can check the signature by using the public key of the transmitting entity. This enables him to be sure of the origin of the message. The receiver must thus have a copy of the transmitter's public key to be able to check that the message effectively originates from the concerned transmitter.

Other public key systems not only transmit with a clear message a signature used to authenticate the transmitter, but also cipher the actual message. The private key of the receiver is then used for him to decode (decipher) the transmitted message, ciphered with the copy of his public key.

The certification authority is used to provide a user with a certificate (binary message) containing the public key of this user associated (most often, concatenated) with other data relating to this user (for example, an identifier of the user, a validity duration of the key, etc.) and with a digital signature. The digital signature attached to the certificate is calculated with the private key of the certification authority. The certification authority provides its public key separately (generally, by other secure means) to a group of concerned users. Any user in possession of a copy of the public key of this certification authority can then check all the certificates generated by this authority (check the signature) and thus obtain trustworthy copies of public keys of other users.

In the application to EMV bank cards, the certification authority is the bank system which generates certificates for all users (banking establishments) by signing their respective public keys (generally by using different keys per card assembly and/or according to the banking establishments). The bank system then provides its public key(s) to the payment terminals (acquirers) to enable them, when a card is introduced into the terminal, to check the certificate coming along with the public key of the card and obtain a copy (certified) of this public key that he may trust. In certain cases, the certificates contain data only (no key).

Symmetrical ciphering mechanisms (with secret keys) are generally also provided and are used to authenticate the data exchanged between the card and the transmitting bank, independently from the authentication performed by the asymmetrical mechanism. In a symmetrical mechanism, the same key is used to cipher and decipher the data, and the receiver needs the secret key of the transmitter. The transmission of this key may use an asymmetrical ciphering.

Most often, the card user is authenticated by the card by introduction of its confidential code (PIN code). The PIN code is transmitted to the user by other means (generally, a mail) and only the card issuer knows it.

In recent systems to which the present invention more specifically applies, when a terminal needs to authenticate a card, it uses a so-called dynamic data authentication (DDA) which consists of requiring from the card to sign a variable message (pseudo-randomly generated) with its private key. This enables the terminal having obtained the public key of the card by decoding its certificate to check that it effectively is the right card and not a fake card.

Bank cards of this type are more and more often capable of processing other applications than the bank application for which they are initially intended. These may be, for example account balance consultations, bank transactions other than a payment, etc. Such other applications are not necessarily linked to the bank system. These may be, for example, loyalty card, transportation card applications, etc.

For the card to be able to implement several applications requires distinct authentication mechanisms between the EMV bank applications and the others. Such authentication mechanisms use asymmetrical ciphering algorithms (public key systems) and are often designated as PKI applications (public key infrastructure).

More generally, an electronic circuit of authentication of a smart card or the like more and more often be able to authenticate the card for different applications, not necessarily managed by the same application provider.

This requires that the smart card contain not only the keys necessary to its authentication for a main application (for example, the EMV application) but also keys for each other secondary application (for example, PKI) that it is likely to support.

A problem which is posed is the introduction, into the card (more specifically into its integrated circuit), of such keys, necessary afterwards for the authentication by the asymmetrical ciphering algorithm (RSA or other). In particular, the request of a certificate by the card from the certification authority of the PKI application should be secured, that is, it should be guaranteed that the public key received by the PKI certification authority does belong to the holder of the card requiring a certificate.

A first solution would be to perform this checking on manufacturing by generating the keys in the card during the so-called mass customization. This solution can, however, not be envisaged due to the time required to generate RSA keys (several seconds per key for 1024-bit keys). Further, after generation of the keys, it would be necessary to complete secure communications with as many trusted third parties as there are PKI applications, in addition to that required by the EMV application, to obtain the corresponding certificates which must be stored in the card.

Further, card holders generally have a subjective impression that the fact for the authentication keys to be generated after manufacturing (while they are in possession of the card) makes the procedure more secure.

FIG. 3 very schematically illustrates in the form of blocks a conventional solution adapted to the generation of secondary application keys during the card lifetime. This solution consists of using a trustworthy terminal (ATM) 20 able to implement various control mechanisms, for example, the checking of the identifier of card 2, the checking of its PIN code, etc. to authenticate the card holder and the connection between the key and this holder. Terminal 20 then communicates over a secure connection with the trusted third party 30 (CA) of the PKI application to obtain the certificates.

A disadvantage of such a solution is that it requires to the card holder who wants to customize a new application on his card to go to a specific location having so-called trustworthy terminals.

It would be desirable to be able to customize PKI applications in smart cards by means of conventional readers (for example, of the type of a card reader equipping a personal computer). Different control mechanisms must then be combined but the problem that the terminal (personal computer) cannot be considered as trustworthy is then posed.

It could have been devised to use a single-use specific code (ONE TIME code) introduced into the card during the customization and used by the card holder like a one-time PIN code. A disadvantage of such a solution is its implementation cost, since it would require placing, in each card, a specific program for a single use.

SUMMARY OF THE INVENTION

According to a first aspect, the present invention aims at overcoming all or part of the disadvantages of known solutions to customize bank cards for PKI applications.

The present invention more specifically aims at a solution adapted to EMV payment cards having an RSA function.

The present invention also aims at providing a solution requiring no structural modification of an existing smart card.

According to a second aspect, the present invention aims at enabling transfer of a certificate transmitted by a certification authority or a trusted third party to a smart card after generation of asymmetrical ciphering keys without needing the card to have to be in a secure environment.

The present invention more specifically aims at the customization of a second application in an electronic circuit of a smart card or the like by a symmetrical mechanism while this application requires a certification authority different from that of a first application for which the circuit has been previously customized.

To achieve all or part of these and other objects, the present invention provides a method of authentication of an electronic circuit for an application implementing an asymmetrical algorithm and using a certification authority, comprising a step of use of an authentication channel of another application implementing the same asymmetrical algorithm and using another certification authority.

The present invention also provides a method for customizing, in an electronic circuit containing a first application using an asymmetrical authentication algorithm and a first certification authority, at least a second application using an asymmetrical authentication algorithm and a second certification authority different from the first one, comprising steps of:

having the electronic circuit generate a pair of public and private keys intended for the second application; and transmitting to the second certification authority, using an authentication channel of the first application, the public key of said pair to obtain a certificate of this public key.

According to an embodiment of the present invention, said circuit has a pair of public and private keys dedicated to the first application, said method comprising steps of:

generation by the electronic circuit of said pair of public and private keys intended for the second application;

digital signature of the public key of the second application by the private key of the first one;

transmission of the public key of the second application and of said signature to the second certification authority; and recording in the circuit of a certificate provided by the second certification authority.

The present invention also provides an electronic circuit.

The present invention further provides a system of customization of electronic circuits for several applications using different certification authorities to obtain certificates of public keys of asymmetrical authentication algorithms.

The foregoing objects, features, and advantages of the present invention, as well as others, will be discussed in detail in the following non-limiting description of specific embodiments in connection with the accompanying drawings.

DETAILED DESCRIPTION

Figure 1:
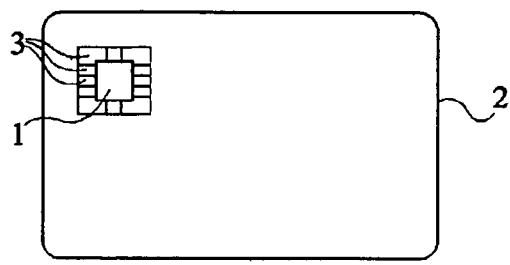
FIG. 1, previously described, shows an example of a smart card of the type to which the present invention applies.
Figure 2:
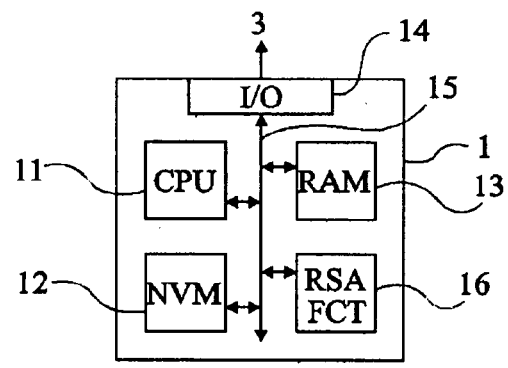
FIG. 2, previously described, very schematically shows in the form of blocks an example of an integrated circuit chip equipping a card of the type to which the present invention applies.
Figure 3:
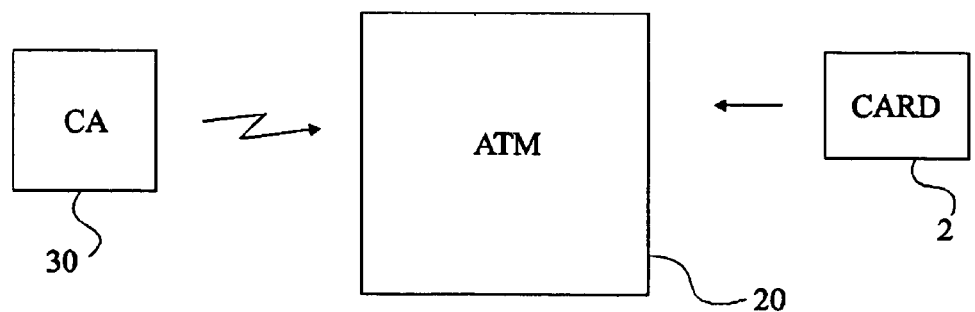
FIG. 3, previously described, very schematically illustrates in the form of blocks a conventional example of a solution for customizing PKI solutions in a smart card.

For clarity, only those steps and elements which are useful to the understanding of the present invention have been shown in the drawings and will be described hereafter. In particular, the calculations performed by the asymmetrical algorithm exploited by the present invention have not been discussed in detail, the present invention being compatible with any conventional asymmetrical algorithm. Further, the PKI applications capable of being supported by a card according to the present invention have not been described in detail since, the present invention is compatible with any conventional PKI application capable of being supported by an EMV-type payment card.

The present invention will be described in relation with an example of application of its first aspect to EMV-type bank cards intended to support PKI-type applications. It however more generally applies, in a second aspect, to any smart card system or with the like electronic element, capable of supporting several applications using asymmetrical authentication algorithms requiring different certification authorities. For example, the present invention also applies to an electronic circuit contained in a USB key for access authorization purposes or to units contained in personal computers (PC), for example, directly on motherboards, to authenticate the executed programs.

A feature of an embodiment of the present invention is to authenticate the connection between the card and the certification authority (trusted third party) of customization of a PKI application (more generally, of a second application) by using the mechanism of standard EMV authentication (more generally, of a first application). In other words, the present invention provides using the EMV application to authenticate the card on customization of a PKI application.

According to its first aspect, the present invention takes advantage from the fact that EMV smart cards provided with an RSA function are able to implement a dynamic data authentication mechanism (DDA). This mechanism is used by the terminal of the EMV application to authenticate the card and its holder. The present invention provides using this mechanism to transmit, to a PKI application certification authority, a key intended for this application generated by the bank card.

More generally and according to its second aspect, the present invention provides using an authentication channel of a first application to authenticate an electronic circuit for customization for a second application using a certification authority different from that of the first one.

To simplify the following description, the different exchanges have been assumed to be plain (not ciphered). In practice, in most cases, the asymmetrical algorithm is used not only to authenticate the card, but also to cipher the transmitted data. For example, the asymmetrical algorithm is used to transmit a key of a symmetrical algorithm used afterwards to cipher the exchanges between two elements.

Figure 4:
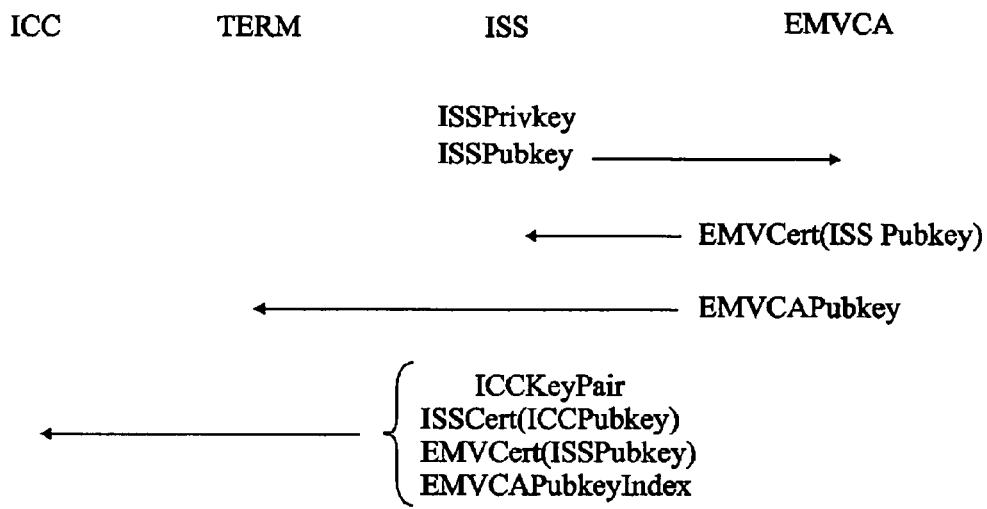
FIG. 4 very schematically shows the exchanges between the components of an EMV system of the type to which the present invention applies, on customization of a bank card.

FIG. 4 very schematically shows the exchanges between the different elements of an EMV system of the type to which the present invention applies, on customization of a bank card.

Issuer ISS of the card (in practice, the banking establishment) generates a pair of public and private keys ISSPubKey and ISSPrivKey and sends its public key to an EMV certification authority EMVCA to obtain an authenticity certificate EMVCert(ISSPubKey) for its own public key ISSPubKey. This certificate is signed by private key EMVCAPrivKey of the EMV certification authority. It can thus only be verified by using the corresponding public key EMVCAPubKey of this authority.

Independently, the EMV certification authority provides to all terminals TERM capable of processing the concerned cards its public key(s) EMVCAPubKey.

On customization of an ICC card, the card issuer selects card data considered as essential, for example, the card identification number, the bank account to which it is attached, etc.

Then, issuer ISS generates:
a pair (ICCKeyPair) of public (ICCPubKey) and private (ICCPrivKey) asymmetrical ciphering keys for the card; and
an authenticity certificate ISSCert(ICCPubKey) for the public key of the card. Only a holder of public key ISSPubKey will be able to obtain the correct signature of key ICCPubKey of the public key of the card.

Finally, the issuer transmits to the card for storage in a non-volatile memory:
pair ICCKeyPair of keys of the card;
certificate ISSCert(ICCPubKey);
its own certificate EMVCert(ISSPubKey) provided by the EMV certification authority; and
an index EMVCAPubKeyIndex of public key EMVCAPubKey of the certification authority. This index is in fact an identifier of the public key which will have to be used for the concerned card. It is used for the terminals to know the certification authority to which the card is affiliated. The terminal indeed generally has several public keys from different authorities to be able to process cards of different origins.

The bank card is then handed to its holder which receives in parallel (generally by mail) the card PIN code which will enable him afterwards to identify as an authorized holder of the corresponding card.

Figure 5:
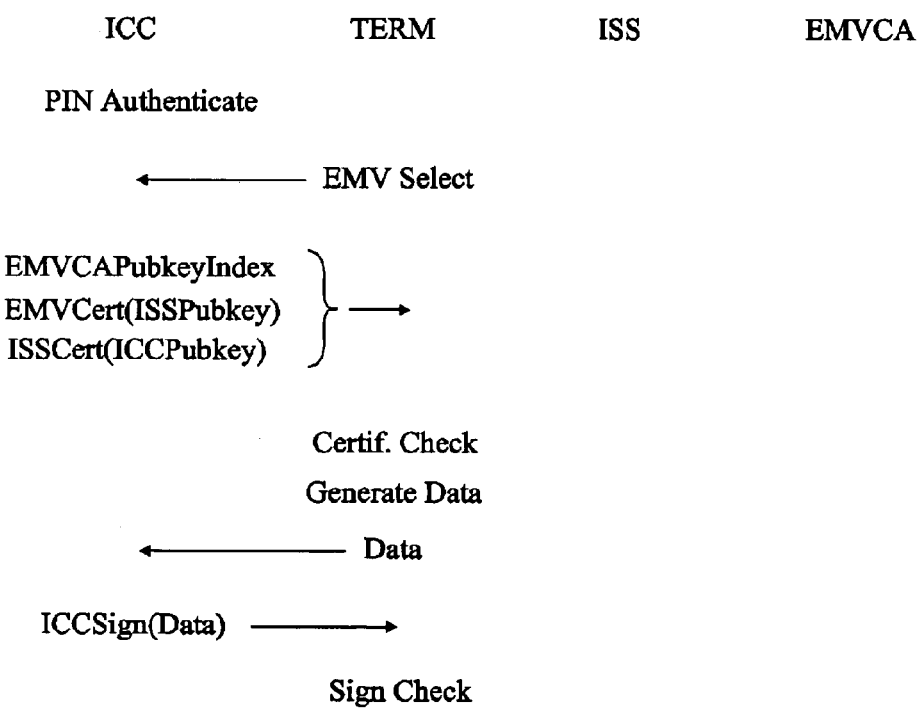
FIG. 5 shows the exchanges between the components of a system according to an embodiment of the present invention in an implementation mode of a smart card customization phase according to the present invention.

FIG. 5 illustrates the exchanges between the different elements of an EMV-type bank card system during a bank transaction, implementing a dynamic data authentication mechanism.

When the card is introduced into a terminal TERM of the corresponding network, that is, a terminal possessing public key EMVCAPubKey of the certification authority, the terminal ensures itself of the card authenticity by performing the following operations.

The terminal starts by asking the card to check (PIN Authenticate) the PIN code keyed in by the holder to check that said code is effectively authorized.

The terminal gives an instruction to the card to select (EMV Select) its EMV application. Then, it reads from the card its identification data, among which:
public key index EMVCAPubKeyIndex of the certification authority;
certificate EMVCert(ISSPubKey) containing the public key of the issuer, signed by private key EMVCAPrivKey of the EMV certification authority; and
certificate ISSCert(ICCPubKey) containing the public key of the card, signed by private key ISSPrivKey of the issuer.

The terminal then selects public key EMVCAPubKey of the certification authority identified from index EMVCAPubKeyIndex read from the card and uses this key to check (Certif. Check) certificate EMVCert(ISSPubKey) of the issuer. In case of a conformity between the signature present in the certificate and that recalculated by the terminal, the public key of issuer ISSPubKey present in the certificate is considered as valid.

Key ISSPubKey is used by the terminal to check (Certif. Check) certificate ISSCert(ICCPubKey), to validate public key ICCPubKey of the card that it contains.

The terminal then possesses the public key of card ICC and it knows that this card does originate from issuer ISS and is effectively authenticated by the EMV authority.

The terminal sends to the card a request for a signature of a message containing dynamic data (Data), for example, pseudo-randomly generated (generate Data).

When it receives these data, the card signs them by using its private key ICCPrivKey. This amounts to executing an asymmetrical ciphering algorithm (in practice, the RSA algorithm) on data Data.

The ciphered message ICCSign(Data) is sent to the terminal which then checks (Sign Check) the card authenticity by checking the identity of signatures between that received from the card and a signature that it calculates (or that it has calculated while its card was doing the same) by using public key ICCPubKey. The obtained key ICCPubKey can then be considered as trustworthy due to the checking of the chain of certificates.

Figure 6:
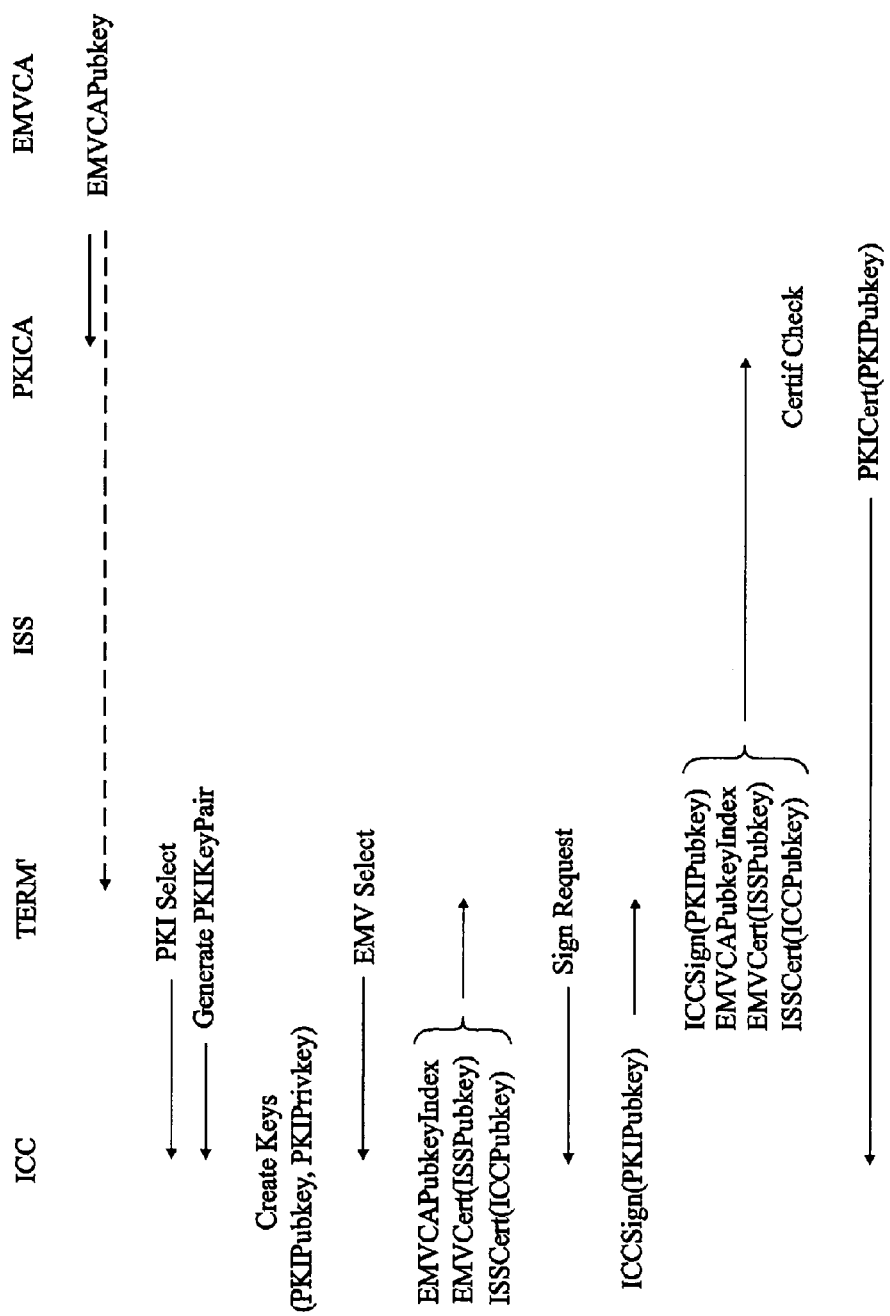
FIG. 6 shows the exchanges between the components of a system according to an embodiment of the present invention in an implementation mode of the authentication mechanisms according to the present invention.

FIG. 6 illustrates an embodiment of a smart card customization phase for another so-called PKI application than the EMV application.

According to this embodiment, independently from the card customization, which is performed as described hereabove in relation with FIG. 4, the EMV certification authority (EMV CA) distributes its public key EMVCAPubKey to all the certification authorities (PKI CA) of the PKI applications likely to process applications on cards of its network. The EMV authority only sends its public key to the bank terminals intended to support the EMV application. The other terminals thus do not have this key. These may be cards readers associated with a personal computer, with a loyalty card of a store, etc.

A first phase comprises, for a PKI application terminal TERM', the authentication of the public key of the PKI application.

The terminal starts sending to the card an instruction to select its PKI application (Select PKI Application).

It then asks the ICC card to generate (Generate PKIKeyPair) a pair PKIKeyPair of RSA ciphering keys for this PKI application. When it receives this instruction, the card creates (Create Keys) public PKIPubKey and private PKIPrivKey keys of the PKI application.

In parallel or subsequently, the terminal gives an instruction to the card to select its EMV application. Then, like for a conventional EMV transaction, it reads from the card identification data, among which:

public key index EMVCAPubKeyIndex of the certification authority;

certificate EMVCert(ISSPubKey) containing the public key of the issuer, signed by the (private) key of the EMV certification authority; and certificate ISSCert(ICCPubKey) containing the public key of the card, signed by the (private) key of the issuer.

The terminal then sends to the card a request (Sign Request) for a signature of a message. However, unlike a conventional transaction, the terminal requests from the card to sign public key PKIPubKey of the PKI application that it has just generated. The message contains at least the key identifier and, in this example, the actual key (possibly completed by pseudo-random data).

When it receives this instruction, the card signs, by using its private key ICCPrivKey (linked to the EMV application) public key PKIPubKey by means of the RSA algorithm.

Signed message ICCSign(PKIPubKey) is sent to the terminal. Unlike an EMV transaction, the terminal is here not necessarily capable of checking the signature performed by the card. Indeed, if the terminal is not EMV, it does not have the certificate provided by the EMV certification authority (containing the public key EMVCAPubKey which would be necessary to decode certificate EMVCert(ISSPubKey) to obtain key ICCPubKey).

The terminal sends to the PKICA certification authority of the PKI application a request for a certificate of public key PKIPubKey by transmitting thereto:

public key ICCSign(PKIPubKey) signed by the ICC card—possibly (for example, if the PKI application key is too large), key PKIPubKey is transmitted in addition to signature ICCSign(PKIPubKey) of this key generated by the EMV application;

index EMVCAPubKeyIndex containing the public key of the certification authority;

certificate EMVCert(ISSPubKey) containing the public key of the card issuer; and certificate ISSCert(ICCPubKey) containing the public key of the card.

The certification authority of the PKI application which owns key EMVCAPubKey checks (Certif. Check) the chain of certificates by:

checking certificate EMVCert(ISSPubKey) with key EMVCAPubKey to check key ISSPubKey; and checking certificate ISSCert(ISSPubKey) with key ISSPubKey to check key ICCPubKey.

Then, by using public key ICCPubKey, the certification authority of the PKI application is capable of checking signature ICCSign(PKIPubKey) to obtain or check public key PKIPubKey created by the card.

The certification authority of the PKI application then generates, with its private key PKICAPrivKey, a certificate PKICert(PKIPubKey) for this public key PKIPubKey.

This certificate is then transmitted to terminal TERM' for writing into the card.

Once in possession of certificate PKICert(PKIPubKey), the card is in possession of a pair of PKI application keys authenticated by certification authority PKI.

As a variation, the issuer of the PKI application, here assumed to be confounded with the PKI certification authority, does not possess public key EMVCAPubKey of the EMV application. In this case, the certification authority of the PKI application forwards certificate EMVCert(ISSPubKey) to the EMV certification authority which decodes key PKIPubKey to transmit it back to the issuer of the PKI application in charge of issuing certificate PKICert(PKIPubKey). According to another variation, the certification authority of the EMV application has kept the pair of keys of the card generated on customization of the EMV application. It is then not necessary to send back up certificates EMVCert(ISSPubKey) and ISSCert(ICCPubKey).

According to another variation applicable to the case where the terminal is a trustworthy terminal (ATM), said terminal checks the chain of certificates and sends public key PKIPubKey to the PKI certification authority.

The implementation of the present invention in its preferred application to EMV systems may use an existing control of these systems. This is a specific authentication control (Internal Auth) internal to the card, the format of which contains (EMV standard 2000):

a parameterizing byte CLA of the control conventionally containing 00;

a byte INS conventionally containing 88;

two bytes P1 and P2 conventionally containing 00 and 00; and a data field Data intended to contain authentication data.

According to this embodiment of the present invention:

Byte CLA is used to indicate that control Internal Auth is the special control of the present invention (data to be signed corresponding to the key and not to data received from the terminal), for example, 90 for ISO standard 7816-4; and according to the size of the key identifier, either bytes P1 and P2 contain a key identifier, or field Data is used to transmit the key identifier.

a PKI application public key signature of the card is then sent in a dynamic data variable ICC which contains:
one byte;
one ATC byte non-modified by the present invention;
one byte giving the state (valid or not) of the PIN code keyed in by the user; and
a field containing the calculated signature of key PKIPub-Key. Preferably, this signature is calculated by a hashing function of SHA-1 type.

However, other available control systems may be used, especially in the more general context of the present invention according to its second aspect.

An advantage of the present invention is that it enables having PKI application keys generated by bank cards, by authenticating them with the EMV application. Several keys for a same PKI application or for different PKI applications (using if need be different PKI certification authorities) may be generated in the same way.

Another advantage of the present invention is that this generation does not require use of terminals dedicated to bank applications (EMV terminals). Indeed, for the customization of PKI applications, the terminal only transmits the public keys of the EMV application in certificates that it is incapable of deciphering. If it is not a bank terminal, it has no public EMV application key.

Another advantage of the present invention is that it is compatible with conventional uses of PKI applications. In particular, once certified by the PKI application authority, the public key (and thus the pair of public and private keys) contained in the card may be used conventionally, any PKI application terminal having public key PKICAPubKey of the certification authority of this application being capable of decoding certificate PKICert(PKIPubKey) that the card transmits thereto to be then able to decode data ciphered by the card with its private key PKIPrivKey of the application.

According to the second aspect of the present invention, the procedure discussed in relation with an EMV application of card authentication to customize a PKI application is applied between a first application (for example, PKI) and a second application (for example, PKI) having a trusted third party different from the first one. The only condition is that these two applications implement an asymmetrical algorithm.

Of course, the present invention is likely to have various alterations, modifications, and improvements which will readily occur to those skilled in the art. In particular, the practical implementation of the present invention by using conventional hardware and/or software means of a smart card is within the abilities of those skilled in the art.

Further, although the present invention has been described in relation with the use of the RSA algorithm, it more generally applies to any asymmetrical algorithm, for example, those based on elliptic curves.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for customizing, in an electronic circuit containing a first application using an asymmetrical authentication algorithm and a first certification authority, at least a second application using an asymmetrical authentication algorithm and a second certification authority different from the first one, said method comprising:
generating, by the electronic circuit in response to a request by a terminal, a pair of public and private keys intended for the second application;
transmitting, by the electronic circuit to the terminal in response to a request by the terminal, a signed public key including the public key of the second application signed using a private key of the first application; and
transmitting to the second certification authority, using an authentication mechanism of the first application, the signed public key to obtain a certificate of this public key.

2. The customization method of claim 1, wherein said circuit has a pair of public and private keys dedicated to the first application, said method comprising:
generating a digital signature of the public key of the second application using the private key of the first application;
transmitting the public key of the second application and said signature to the second certification authority; and
recording, in the circuit, a certificate provided by the second certification authority.

3. A system of customization of electronic circuits for several applications using different certification authorities to obtain certificates of public keys of asymmetrical authentication algorithms, configured to implement the method of claim 1.

4. A method for customizing a card including an electronic circuit that executes a first application, using an asymmetrical authentication algorithm and a first certification authority, comprising:
the electronic circuit generating, in response to a request by a terminal, a public key and a private key for a second application to be executed;
the electronic circuit transmitting to the terminal, in response to a request by the terminal, a signed public key of the second application, using an authentication mechanism of the first application;
the electronic circuit receiving from a second certification authority a certificate of the public key of the second application; and
the electronic circuit storing the certificate to customize the card for use with the second application.

5. A method as defined in claim 4, wherein the electronic circuit has a public key and a private key for the first application, the method comprising:
generating a digital signature of the public key of the second application, using the private key of the first application; and
transmitting the public key of the second application and the digital signature to the second certification authority.

6. A method as defined in claim 4, wherein transmitting further comprises transmitting identification data including a public key index associated with the first certification authority, a first certificate including a public key of the issuer of the card, and a second certificate containing a public key of the card.

7. A card including an electronic circuit that executes a first application, using an asymmetrical authentication algorithm and a first certification authority, comprising:
a memory element; and
a processor configured to:
generate, in response to a request by a terminal, a public key and a private key for a second application to be executed;

transmit to the terminal in response to a request by the terminal, a signed public key of the second application, using an authentication mechanism of the first application;

obtain from a second certification authority a certificate of the public key of the second application; and store the certificate in the memory element to customize the card for use with the second application.

8. A card as defined in claim 7, wherein the processor is further configured to generate a digital signature of the public key of the second application, using the private key of the first application, and to transmit the public key of the second application and the digital signature to the second certification authority.

9. A card as defined in claim 7, wherein the processor is further configured to transmit identification data including a public key index associated with the first certification authority, a first certificate including a public key associated with an issuer of the card, and a second certificate including a public key of the card.

* * * * *